United States Patent [19]
Robison

[11] 3,945,904
[45]*Mar. 23, 1976

[54] PROCESS CONTROL SYSTEM
[75] Inventor: James Ray Robison, La Mirada, Calif.
[73] Assignee: International Telephone & Telegraph Corporation, New York, N.Y.
[ * ] Notice: The portion of the term of this patent subsequent to Dec. 17, 1991, has been disclaimed.
[22] Filed: Feb. 11, 1974
[21] Appl. No.: 441,103

[52] U.S. Cl............ 204/195 T; 23/254 E; 23/255 E; 423/574 R
[51] Int. Cl.² ......................................... G01N 36/16
[58] Field of Search......... 423/574, 576; 204/195 T, 204/195 F, 195 S, 277, 278; 23/254 E, 255 E, 262, 253 A, 255 R

[56] References Cited
UNITED STATES PATENTS

| | | | |
|---|---|---|---|
| 2,200,529 | 5/1940 | Baehr et al. | 423/576 |
| 2,953,441 | 9/1960 | Clauss | 23/255 E |
| 3,026,184 | 3/1962 | Karasek | 23/255 E |
| 3,219,415 | 11/1965 | Hensley | 23/262 |
| 3,448,031 | 6/1969 | Robinson | 204/195 T |
| 3,692,480 | 9/1972 | Snoek et al. | 423/574 |
| 3,812,243 | 5/1974 | Landrum et al. | 423/574 |
| 3,822,341 | 7/1974 | Smith | 423/574 |
| 3,854,884 | 12/1974 | Robison | 23/253 A |

*Primary Examiner*—Walter R. Satterfield
*Attorney, Agent, or Firm*—A. Donald Stolzy

[57] ABSTRACT

An improved and modified Claus process control system utilizing first and second coulometric titrators for automatically controlling the amount of oxygen used in burning a portion of the hydrogen sulfide ($H_2S$) in flue gases. The first and second titrators are fed sulfur dioxide ($SO_2$) and $H_2S$ scrubbed samples, respectively, of the flue gases downstream of the oxygen injection point. The first and second titrators produce $H_2S$ and $SO_2$ analog output signals, respectively, which are used to control the rate of flow of oxygen or air injected in a manner such that the samples of the flue gases contain $H_2S$ in a concentration which is approximately or exactly equal to twice the concentration of the $SO_2$ therein.

12 Claims, 5 Drawing Figures

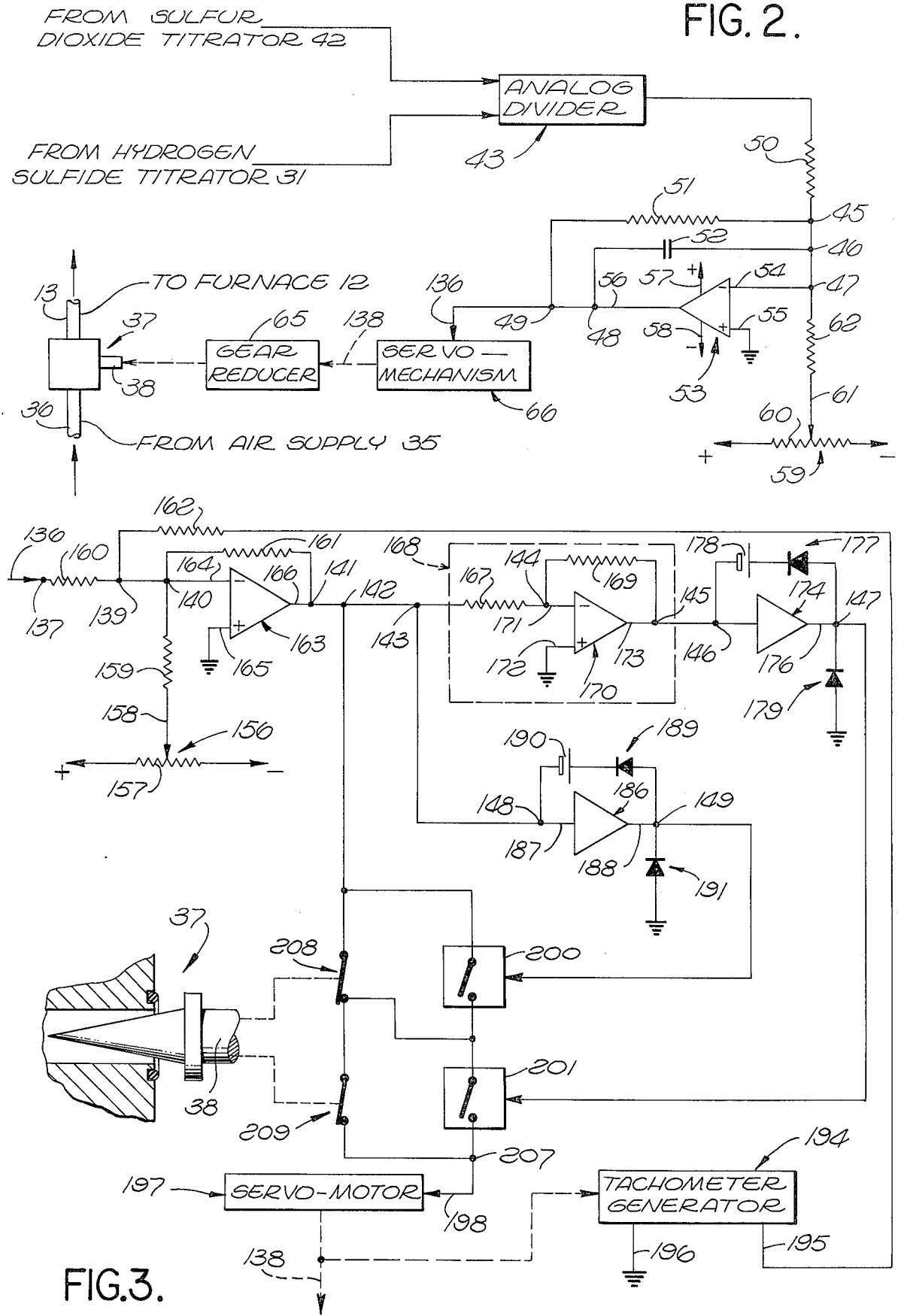

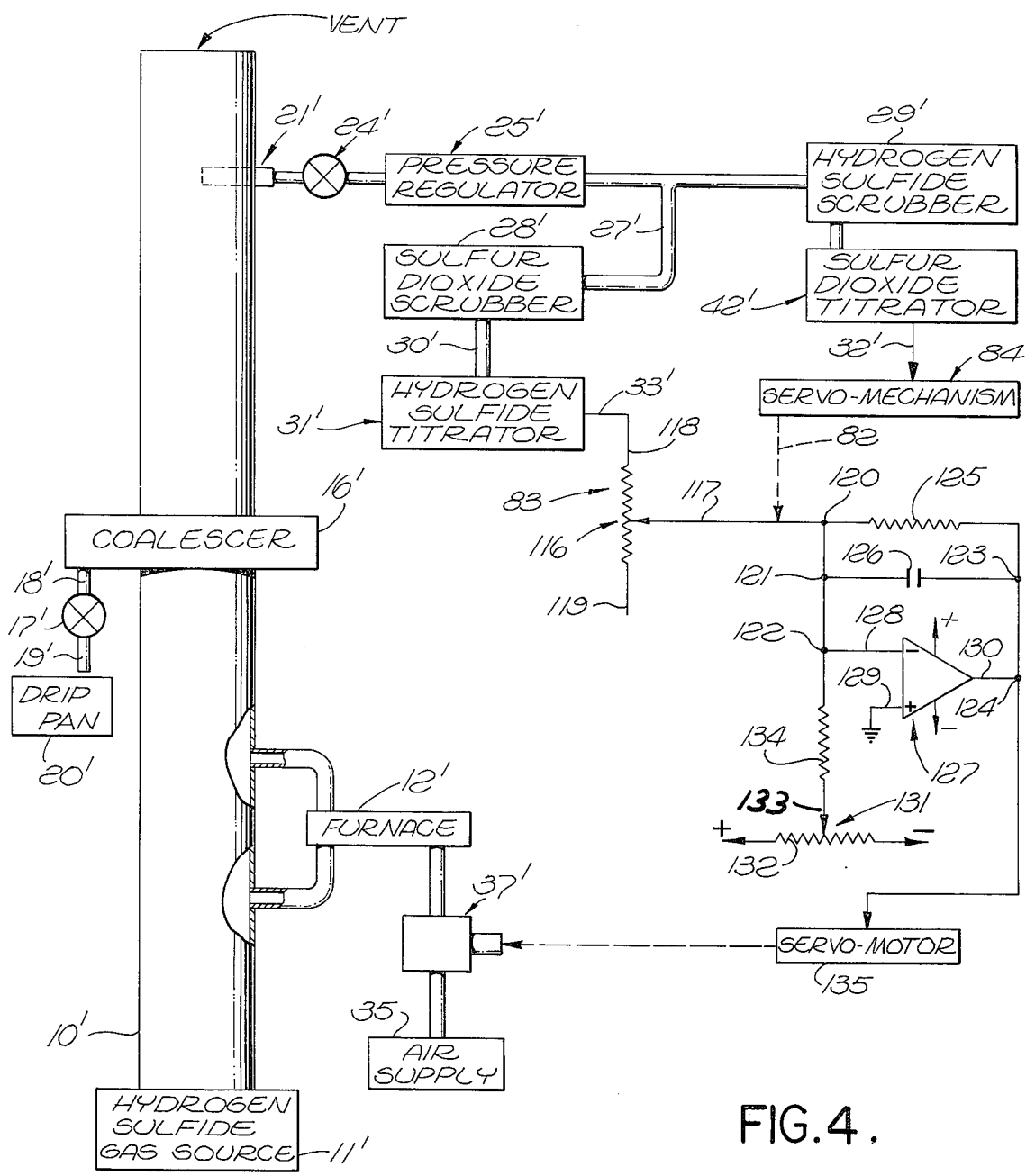
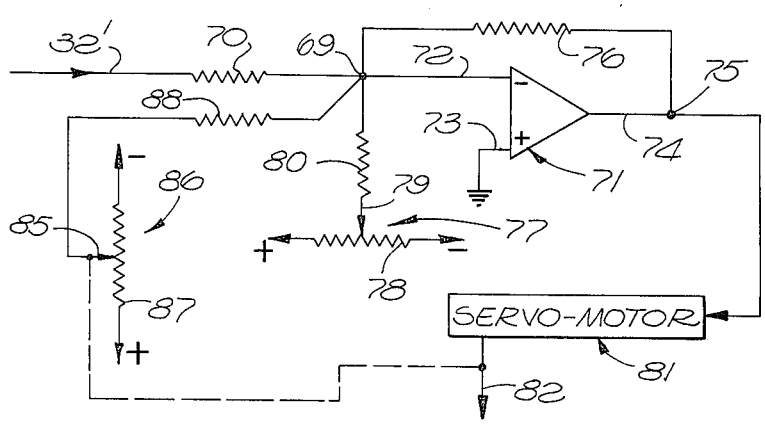
FIG. 4.
FIG. 5.

PROCESS CONTROL SYSTEM

BACKGROUND OF THE INVENTION

This invention relates to the process control art, and more particularly, to an improved method of and system for controlling the Claus process.

Prior art methods and systems for controlling prior art forms of the Claus process have been very complex, expensive and not substantially reliable or accurate.

SUMMARY OF THE INVENTION

In accordance with the present invention, the above-described and other disadvantages of the prior art are overcome by providing a Claus process control of oxygen injection by the use of a fluid sample, a sulfur dioxide scrubber, a hydrogen sulfide scrubber and two coulometric titrators.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 2 is a schematic diagram of a controller shown in FIG. 1;

FIG. 3 is a schematic diagram of a servo-mechanism shown in FIG. 2;

FIG. 4 is a schematic diagram of an alternative embodiment of the present invention; and FIG. 5 is a schematic diagram of a servo-mechanism shown in FIG. 4.

DESCRIPTION OF THE PREFERRED EMBODIMENTS

Figure 1:
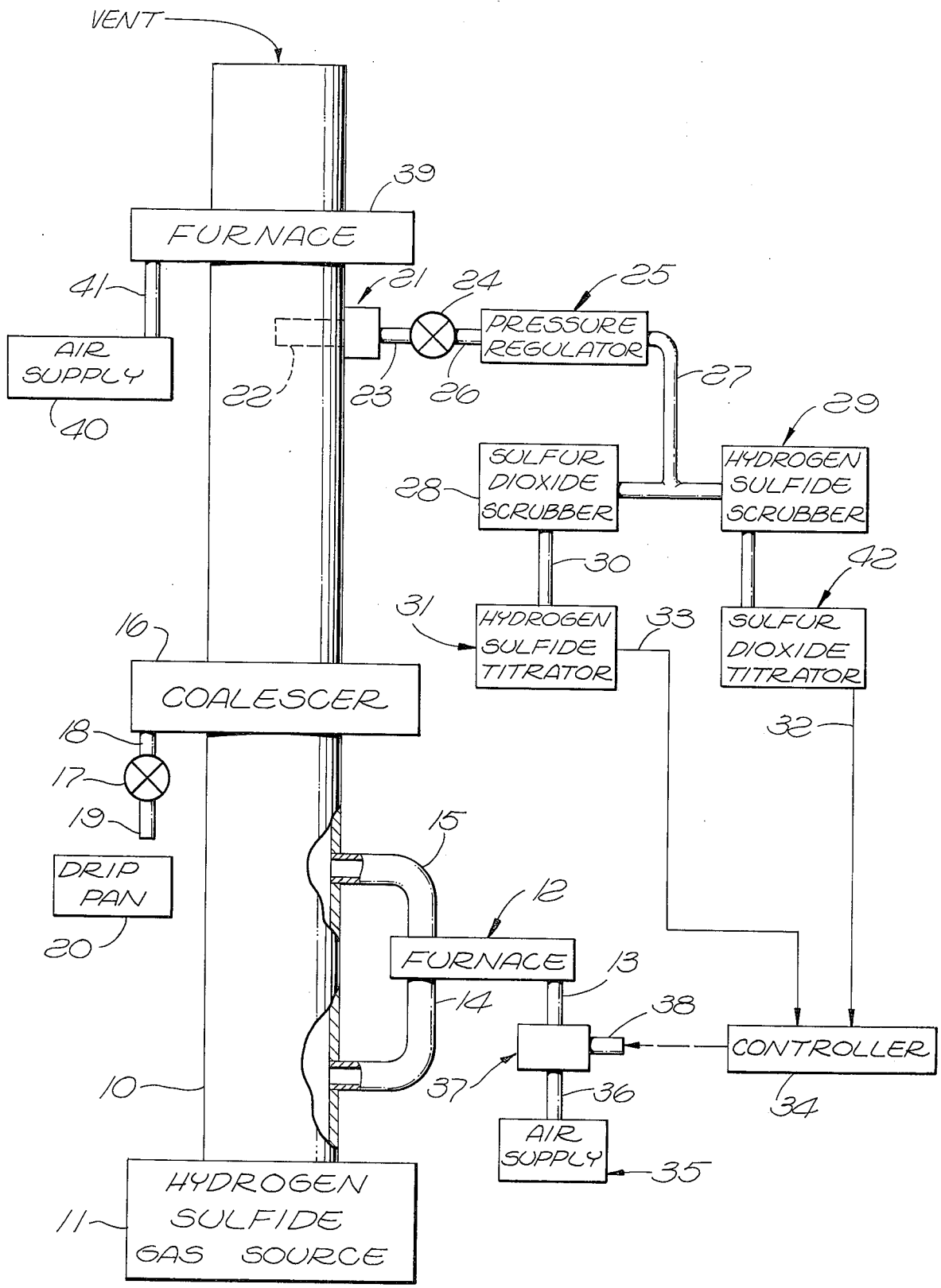
FIG. 1 is a block diagram of one embodiment of the present invention.

In the drawings, in FIG. 1, a new Claus process control system is illustrated. A conventional flue is indicated at 10 which may carry only hydrogen sulfide ($H_2S$) or flue gases, only a portion of which at least sometimes includes hydrogen sulfide and normally in the form of a gas. A hydrogen sulfide gas source is indicated at 11. Source 11 may, for example, be any means for burning fossil or other fuels.

According to the Claus process, a portion of the hydrogen sulfide in flue 10 is oxidized to form sulfur dioxide ($SO_2$) and water. The sulfur dioxide and the remaining hydrogen sulfide is then combined to form elemental sulfur and water in accordance with the following chemical equation, hereinafter referred to as the Claus equation:

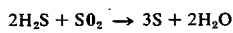

$$2H_2S + SO_2 \rightarrow 3S + 2H_2O$$

where $H_2S$ is hydrogen sulfide, $SO_2$ is sulfur dioxide, S is the sulfur atom, H is the hydrogen atom, and O is the oxygen atom.

In FIG. 1, a furnace 12 is provided having an inlet conduit 13 through which oxygen is supplied. The oxygen in furnace inlet 13 may be supplied in the form of air, if desired. Furnace 12 has another inlet conduit 14 connected from flue 10, and an outlet conduit 15 connected back to flue 10 downstream from the point of connection of furnace inlet conduit 14 with flue 10.

As will be explained hereinafter in greater detail, in FIG. 1 a portion of the hydrogen sulfide gas in flue 10 is drawn through furnace inlet conduit 14 and oxidized with the oxygen in the air supplied in furnace conduit 13. Furnace 12 is closed except for the inlet conduits 13 and 14 thereof, and the outlet conduit 15 thereof. The combustion products formed in furnace 12, thus, are injected back into flue 10 through outlet conduit 15 of the furnace 12. A conventional coalescer 16 is connected in the flue 10 to cause the reaction to move in the direction of the arrow in the equation. Coalescer 16 may be entirely conventional, if desired. Coalescer 16, if desired, may be of the baffle type having its own heat source and heat exchanger to maintain the fluids passing therethrough at between about 300° F. and 400° F. Molten elemental sulfur may be removed from coalescer 16 by opening manually operable valve 17 allowing molten sulfur to pass from an outlet conduit 18 through valve 17 and a spigot 19 to a drip pan 20.

Downstream of the coalescer 16 in FIG. 1 is a fluid sampler 21 which has a probe 22 that is sealed through the wall of flue 10 and an outlet conduit 23. Sample 21 may be entirely conventional. Alternatively, sample 21 may be identical to the sampler disclosed in copending application Ser. No. 224,026 filed Feb. 7, 1972, now U.S. Pat. No. 3,819,330, by David M. Creighton for FLUID MONITORING SYSTEM AND FLUID SAMPLING METHOD AND APPARATUS FOR USE THEREWITH.

A manually operable blocking valve 24 in FIG. 1 is connected from sampler outlet conduit 23. Valve 24 is employed simply to allow the outward flow of a sample fluid flowing through outlet conduit 23 of sampler 21 to be turned completely off.

Also shown in FIG. 1 is a pressure regulator 25 having an inlet conduit 26 connected from valve 24 and an outlet conduit 27 connected to sulfur dioxide and hydrogen sulfide scrubbers 28 and 29, respectively. A hydrogen sulfide titrator 31 and a sulfur dioxide titrator 42 are connected from scrubbers 28 and 29, respectively.

In some cases, valve 24 in FIG. 1 and pressure regulator 25 may be completely bypassed by respective conduits and the valve 24 and the pressure regulator 25 eliminated.

Sulfur dioxide scrubber 28 in FIG. 1 has an outlet conduit 30 connected to a hydrogen sulfide titrator 31. Titrator 29 has an electrical output lead 32 upon which a D.C. voltage is impressed that is directly proportional to the sulfur dioxide concentration in the fluid flowing in pressure regulator outlet conduit 27.

Hydrogen sulfide titrator 31 in FIG. 1 has an electrical output lead 33 upon which is impressed a D.C. voltage directly proportional to the hydrogen sulfide only, and not the sulfur dioxide, in the sample fluid in the pressure regulator outlet conduit 27.

The titrator output leads 32 and 33 in FIG. 1 are connected to a controller 34. Controller 34 adjusts the rate of air flow through furnace inlet conduit 13 from an air supply 35 via an air supply outlet conduit 36 through a needle valve 37 connected therefrom to the lower end of furnace inlet conduit 13.

Needle valve 37 in FIG. 1 may be entirely conventional and has a threaded needle or input device 38 which is rotated by controller 34 responsive to a predetermined function of the magnitudes of the D.C. voltages which appear on titrator output leads 32 and 33 and other variables.

In FIG. 1 a furnace 39 is shown connected in flue 10 downstream of sample probe 22 and fed by an air supply 40 via a conduit 41. In this manner, any hydrogen sulfide remaining in flue 10 at the position of sample probe 22 is oxidized to form sulfur dioxide and water usually in vapor form. This is usually preferred although furnace 39, air supply 40 and conduit 41 may be omitted in some cases and the flow from sample probe 22 upwardly in flue 10, as viewed in FIG. 1, vented to the atmosphere. This is illustrated in connection with a flue 10' shown in FIG. 4.

Controller 34 is shown in FIG. 2 having output lead 32 of sulfur dioxide titrator 29 connected as an input to an analog divider 43. Analog divider 43 also is connected from output lead 33 of hydrogen sulfide titrator 31.

Titrators 31 and 42 may be identical, if desired, and of the type disclosed in U.S. Pat. No. 3,448,031. The titrator may or may not be internally adjusted electrically for calibration or otherwise both as to zero and as to span. Their output signals may or may not be weighted according to two times the molecular weight of hydrogen sulfide and unity times the molecular weight of sulfur dioxide, as desired, and respectively.

In FIG. 2, various junctions 45, 46, 47, 48 and 49 are shown. A resistor 50 is connected from an output lead of analog divider 43 to junction 45. Junctions 45, 46 and 47 are connected together. Junctions 48 and 49 are connected together. A resistor 51 is connected between junctions 45 and 49. A capacitor 52 is connected between junctions 46 and 48.

A differential amplifier 53 is provided in FIG. 2, amplifier 53 having an inverting input lead 54, a non-inverting input lead 55 and an output lead 56 connected respectively from junction 47, ground and to junction 48.

Amplifier 53 in FIG. 2 also has a positive power input lead 57 which may be connected to a constant potential of, for example, 12 volts positive. Amplifier 52 also has a negative power input lead 58 which may be, for example, connected to a potential of 12 volts negative.

A potentiometer 59 is shown in FIG. 2 including a winding 60 connected between, for example, 12 volts positive and 12 volts negative.

Potentiometer 59 in FIG. 2 has a wiper 61. A resistor 62 is connected between potentiometer wiper 61 and junction 47.

In FIG. 2, a servo-mechanism 66 is connected from junction 49 to valve input device 38 through a gear reduce 65. For clarity, needle valve 37 is illustrated in both FIGS. 1 and 2.

The output of gear reducer 65 in FIG. 2 drives valve needle screw or input device 38. The rate of change of the input to gear reducer 65 is varied by the use of servo-mechanism 66.

The use of servo-mechanism 66 in FIGS. 2 and 3 to drive gear reducer 65 makes possible a rate adjustment in accordance with an integral of rate. The use of gear reducer 65 slows down the rate of change with respect to time of the flow rate of the air in furnace inlet 13 and stabilizes the system. It can be made unconditionally stable in this and conventional ways. A change in the control voltate is also slowed down by the use of capacitor 52 in FIG. 2 although the use of capacitor 52 is optional.

Analog divider 43 in FIG. 2 both may be entirely conventional. The same is true of all of the differential amplifiers disclosed herein, servo-mechanism 66 (velocity servo) and gear reducer 65. The same is also true of source 11, flue 10, needle valve 37, furnace 12, valves 17 and 24, all conduits disclosed herein, drip pan 20, furnace 39, air supply 40, pressure regulator 25, both titrators 31 and 42 and scrubber 28. The same is also true of air supply 35.

The mechanical construction of scrubber 29 is conventional, but the solution therein is not. This solution is related to a material disclosed on page 72 of *Air Pollution II*, Second Edition, by Arthur C. Stern (Academic Press, New York, 1968) and in H. W. Washburn and R. R. Austin, *Air Pollution*, Proc. U.S. Tech. Conf. Air Pollution, 1950, page 596 (McGraw-Hill, New York, 1952).

Preferably the scrubber 29 contains 91 ml. of concentrated $H_2SO_4$ added to about 600 ml. of water. Cool to room temperature. Then add 31 ml. of concentrated HCl. Then add more water to make up a 900 ml. solution. Then mix in $Bi_2O_3$ until the solution is saturated with $Bi_2O_3$. Filtering is the last step.

For the solution of scrubber 29, it is also possible of $Bi_2O_3$ in a 9:1 acid (9 = acid) mix of $4NH_2SO_4 - 4NHCl$ (N = normal). Normality = 0.5 mole per liter.

The solution in scrubber 29 may contain bismuth subcarbonate and/or bismuth subchloride in addition to or in lieu of $Bi_2O_3$. Other equivalents may be possible.

The pH of the solution of scrubber 29 is preferably about or below 1.5 to 0.05 or zero.

Analog subtractor 42 in FIG. 2 produces a D.C. voltage on the output lead 44 thereof which is directly proportional to the sulfur dioxide in the sample fluid in pressure regulator outlet conduit 27.

A D.C. voltage is impressed upon the output lead of divider 43 in FIG. 2 by analog divider 43 that is directly proportional to the ratio of the hydrogen sulfide concentration to that of the sulfur dioxide concentration in pressure regulator outlet conduit 27. All the structure connected from the output of analog divider 43 to servo-mechanism 66 is primarily an analog adder except for the capacitor 62 which slows down the control. What the adder adds, for example, is the D.C. output voltage of analog divider 43 and the voltage which appears at potentiometer wiper 61. In general, if the D.C. voltage at the output of analog divider 43 is positive, the voltage appearing on potentiometer wiper 61 will be a negative voltage equal to a voltage necessary to cause the output of amplifier 53 to be zero. Normally potentiometer wiper 61 will be moved to a position on winding 60 such that the magnitude of the negative potential on wiper 61 will represent a ratio of the concentrations of hydrogen sulfide and sulfur dioxide in the sample fluid in the outlet conduit 27 of pressure regulator 25 equal to 2:1. This ratio is determined by the Claus equation. Note that this equation requires two molecules of hydrogen sulfide to be combined with one molecule of sulfur dioxide. Somewhat different ratios may be employed by adjusting the position of wiper 61 on winding 60 of potentiometer 59. The position of wiper 61 also may be calibrated with indicia in terms of the ratio of the concentration of hydrogen sulfide to that of sulfur dioxide.

As shown in FIGS. 2 and 3, servo-mechanism 66 has an input lead 136 connected from junction 49 in FIG. 2 to an input junction 137 in FIG. 3. As shown in both FIGS. 2 and 3, servo-mechanism 66 has an output shaft 138 which is connected to the input of gear reducer 65 in FIG. 2.

In FIG. 3, various other junctions are shown throughout the circuit including junctions 139, 140, 141, 142, 143, 144, 145, 146, 147, 148, 149 and 207.

A potentiometer 156 is shown in FIG. 3 having a winding 157 and a wiper 158. A resistor 159 is connected from wiper 158 to junction 140. Junctions 139 and 140 are connected together. A resistor 160 is connected between junctions 137 and 139. A resistor 161 is connected between junctions 140 and 141. A resistor 162 is connected from an output lead 195 of a tachometer generator 194 driven by a servo-motor 197. Tachometer generator 194 has another output lead 196 which is grounded.

In FIG. 3, a differential amplifier 163 is provided having an inverting input lead 164 connected from junction 140 and a non-inverting input lead 165 connected to ground. Amplifier 163 also has an output lead 166 connected to junction 141. Junctions 141, 142 and 143 are connected together. A resistor 167 in a conventional inverter amplifier 168 is connected between junctions 143 and 144. A resistor 169 is connected between junctions 144 and 145. A differential amplifier 170 is provided with an inverting input lead 171 connected from junction 144, a non-inverting input lead 172 connected to ground, and an output lead 173 connected to junction 145. Junctions 145 and 146 are connected together. An amplifier 174 has an output lead connected from junction 146 and an output lead 176 connected to junction 147. A diode 177 and a biasing source of potential 178 are connected in succession in series in that order from junction 147 to junction 146. Source 178 is poled to back bias diode 177. A diode 179 is connected from ground to junction 147 and poled to be conductive in a direction toward junction 147.

In FIG. 3, conventional electronic switches are illustrated at 200 and 201. Receipt of a positive potential at junction 147 closes switch 201. When junction 147 is maintained at ground potential, switch 201 is open, as shown.

In FIG. 3, an amplifier 186 is shown having an input lead 187 connected from junction 148 and an output lead 188 connected to junction 149. As before, a diode 189 and a source of biasing potential 190 are connected in succession in series in that order from junction 149 to junction 148. Again, source 190 is poled to back bias diode 189. Note will be taken that both diodes 177 and 189 are poled to be conductive in directions away from junctions 147 and 149, respectively. A diode 191 is connected from ground to junction 149, and poled to be conductive in a direction toward junction 149. Junctions 143 and 148 are connected together. When the potential of junction 149 is positive with respect to ground, switch 200 is closed by the application of a positive potential thereto.

As shown in FIG. 3, servo-motor 197 is provided having an input lead 198 connected from a junction 207 and output shaft 138 which drives gear reducer 65 (FIG. 2), and drive tachometer generator 194, as well.

In FIG. 3, normally closed limit switches 208 and 209 are opened on the respective full closing and full opening of valve 37. Limit switches 208 and 209 are connected in parallel with electronic switches 200 and 201, respectively. Switches 200 and 201 are connected in succession, in series in that order from junction 142 to junction 207.

In the operation of the servo-mechanism 66 shown in FIG. 3, because of the inversions of amplifiers 53 and 163 in FIGS. 2 and 3, respectively, the tachometer generator output is returned via resistor 162 to junction 139. The phrase "positive or negative potential" herein means positive or negative both with respect to ground. The potential of junction 49 (FIG. 2) may, thus, be positive when the air flow rate in conduit 13 is increasing and the feedback from tachometer generator 194 is positive. The velocity feedback from tachometer generator 194 makes the process control system stable because the angular velocity of device 38 in FIG. 1 is zero when the displacement error (junction 49) is zero (ground potential).

In FIG. 3, the potential of junction 147 is positive when the potential of junction 142 is negative. The potential of junction 149 is positive when the potential of junction 142 is positive. Diodes 179 and 191 maintain the potentials of the respective junction 147 and 149 at ground potential when the junctions 146 and 148 have potentials negative with respect to ground. Amplifiers 174 and 186 are, thus, non-inverting amplifiers.

OPERATION

In the operation of the embodiment illustrated in FIG. 1, hydrogen sulfide is supplied by source 11 and with other flue gases rises in flue 10. A portion of this hydrogen sulfide gas is then oxidized in furnace 12. The combustion products of furnace 12 are then injected back into flue 10 via outlet conduit 15, furnace 12 being closed except for air inlet conduit 13, flue gas inlet conduit 14, and outlet conduit 15.

Sampler 21 then removes a sample of the flue gas mixture in flue 10 including both hydrogen sulfide and sulfur dioxide gas after a large percentage of each (e.g. 99 percent) has been removed by the coalescer 16. This sample passes through conduit 23, valve 24, conduit 26, pressure regulator 25 and pressure regulator outlet conduit 27. From this point, a first portion of the sample gas in conduit 27 is passed through sulfur dioxide scrubber 28 to hydrogen sulfide titrator 31. A second portion thereof is passed through hydrogen sulfide scrubber 28 to sulfur dioxide titrator 42. The D.C. voltages on the output leads 32 and 33 of titrators 42 and 31 are then directly proportional to the sulfur dioxide and hydrogen sulfide concentrations, respectively, in the fluid sample passing through pressure regulator outlet conduit 27.

Sulfur dioxide scrubber 28 removes the sulfur dioxide from the first portion of the fluid sample passing through conduit 27. Hydrogen sulfide scrubber 29 removes the hydrogen sulfide from the second portion. The transfer function between the output signals of titrators 31 and 42 to the rate of flow of air in conduit 13 is not critical and need not be linear with any function of hydrogen sulfide and/or sulfur dioxide concentration in the fluid sample flowing in conduit 27. This is true because the system of FIG. 1 is a null seeking servo-mechanism. Further, controller 34 may be a position or velocity servo which operates on a number of different functions of the output signals of titrators 31 and 42. When controller 34 is that shown in FIG. 2, and servo-mechanism 66 therein is that shown in FIG. 3, the servo-mechanism 66 is provided with a velocity feedback to make the process stable. This is not always necessary.

In the case of FIG. 2, controller 34 turns needle valve screw 38 until the oxygen supply is adequate to drive the D.C. voltage appearing at the output of analog divider 43 in FIG. 2 to the same potential at which the wiper 61 of potentiometer 59 is set. This is also not necessarily true. This assumes that the resistance of each of the resistors 50 and 62 in FIG. 2 is the same. If they are different, the D.C. potential of the output of divider 43 will be a predetermined fraction of, larger or smaller than, the potential of potentiometer wiper 61.

In accordance with the foregoing, it will be appreciated that servo-mechanism 66 may be of the type to be described in connection with FIG. 5, and gear reducer 65 may be omitted in some cases. Further, needle valve 37 may be omitted and another device substituted therefor.

All the structures shown in FIG. 4 may be identical to all those respective structures shown in FIG. 1 except the structures connected from titrator output leads 32' and 33' to needle valve 37'.

In FIG. 4, a servo-mechanism 84 is connected from titrator output lead 32'.

Servo-mechanism 84 is shown in FIG. 5. In FIG. 5, lead 32' is connected to a summing junction 69 by a resistor 70. A differential amplifier 71 has an inverting input lead 72 connected from junction 69 and a non-inverting input lead 73 connected to ground. Amplifier 71 has an output lead 74 connected to an output junction 75. A resistor 76 is connected between junctions 69 and 75. A potentiometer 77 is connected, as before, and has a winding 78 and a wiper 79. A resistor 80 is connected between junction 69 and wiper 79, as before. A servo-motor 81 has an output shaft 82 which drives wiper 117 on winding 116 of a potentiometer 83 (FIG. 4). The servo-mechanisms 66 and 84 in FIGS. 1 and 4, respectively, may not be conventional and may or may not be identical to each other or to the servo-mechanisms shown in FIGS. 3 and 5. The servo-mechanism 84 in FIG. 5 has a feedback from a wiper 85 of a potentiometer 86 connected, as before, with a winding 87. Wiper 85 is connected to junction 69 via a resistor 88.

In FIG. 4, a hyperbolic potentiometer winding 116 has one end 118 connected from titrator output lead 33' and another lead 119 which is not connected to anything. The hyperbolic winding makes the potential at a junction 120 directly proportional to the ratio of the potentials on leads 32' and 33'. The reciprocal, however, could be used.

In FIG. 4, various junctions are provided throughout the circuit. These junctions are 121, 122, 123 and 124. A resistor 125 is connected between junctions 120 and 123. A capacitor 126 is connected between junctions 121 and 123. A differential amplifier 127 is provided having an inverting input lead 128 connected from junction 122, and a non-inverting input lead 129 connected to ground. Amplifier 127 has an output lead 130 connected to junction 124. Another potentiometer is provided at 131 having a winding 132 and a wiper 133. A resistor 134 is connected from wiper 133 to junction 122. A servo-motor 135 is connected from junction 124 to needle valve 37'.

All identical reference numbers, except for the use of one or more prime marks, refer to structures which may or may not be identical, as desired.

The word "fluid" is hereby defined for use herein and for use in the claims, unless operative with liquids, to means substantially only a single gas compound or substantially only a mixture of different gases. For example, the invention will be found useful in connection with the removal of sulfur from a mixture of gases including hydrogen sulfide gas which normally are vented from a flue.

As explained previously, preferably an excess of hydrogen sulfide gas is introduced to furnace 12 through inlet conduit 14 to make sure that the oxygen in the air introduced through inlet conduit 13 does not exist as elemental oxygen gas in outlet conduit 15 and to make sure that most all available oxygen oxidizes the hydrogen sulfide. Normally, furnace 12 may take approximately one-third to all the flow through flue 10.

Additional inverting and non-inverting amplifiers may be used, as desired, throughout all of this disclosure.

If desired, any one or more or all of the computation functions performed by the controllers disclosed herein may be performed by digital computers instead of analog computers without departing from the invention.

Capacitor 52 in FIG. 2 and capacitor 126 in FIG. 4 both may be omitted, if desired.

Controller 34 may use one or more of any digital or analog computers, conventional or not. Alternatively, portions of the controller computing functions may be analog and other portions may be digital. Still further, all of the computer portions of the controller may be analog or all of them may be digital.

Scrubber 28 may be entirely conventional except that the scrubber solution employed therein may or may not be conventional. For example, the solution of scrubber 28 may be that disclosed in U.S. Pat. No. 3,757,488 and in copending application Ser. No. 406,379 filed Oct. 15, 1973, by J. R. Robison for METHOD OF AND SYSTEM FOR CONTROLLING A CHEMICAL PROCESS now U.S. Pat. No. 3,854,884.

In some cases, sampler probe 22 in FIG. 1 may be located either upstream or downstream from coalescer 16. However, outlet conduit 15 of furnace 12 will always be connected to flue 10 upstream of coalescer 16, as shown in FIG. 1. Further, sampler probe 22 will always be located downstream of the connection of conduit 15 with flue 10.

The word "concentration" is hereby defined for use herein and for use in the claims as well, to mean approximately or exactly the percent by weight or volume (percent by weight and by volume are about the same) or this percent divided by the molecular weight. The Claus equation is a molecular solution. As is well known, the molecular weight of hydrogen is about 1 gram, the molecular weight of sulfur is about 32 grams and the molecular weight of oxygen is about 16 grams. The molecular weight of hydrogen sulfide is then about 34 grams, and the molecular weight of sulfur dioxide is about 64 grams.

Conventional titrators, e.g. those of the type disclosed in U.S. Pat. No. 3,448,031, have conventional zero and span adjustments for molecular weight weighting, if desired. Such weighting requires only constant scale factors, i.e. zero and/or span.

The phrase "molecular ratio" is hereby defined for use herein and in the claims to mean the ratio of the gram molecular weight of hydrogen sulfide to the gram molecular weight of sulfur dioxide or the reciprocal thereof.

The manner of supplying oxygen and/or air through inlet conduit 13 of furnace 12 may be performed in a great many ways different from that disclosed herein without departing from the present invention. Included, but not limited to, one or more of these ways is utilizing an air pump, the speed of which is operated by controller 34. Further, air supply 35 may be either a compressed air source, a compressed oxygen source or an air compressor having an intake from the atmosphere.

Valve 37 need not be a needle valve but may be another valve which may be varied to vary the rate of flow of air or oxygen in furnace inlet conduit 13.

If valve 37 is an air pump or compressor, controller 34 may supply a velocity control thereof using a tachometer feedback similar to or the same as that shown in servo-mechanism 66 of FIG. 3. An additional amplifier and servo-motor may be provided for this purpose, if desired.

The phrase "source of oxygen" is hereby defined for use herein and for use in the claims as including, but not limited to, a source of compressed oxygen or air, and oxygen or air pump, a furnace with a variable draft and an atmospheric or oxygen intake or otherwise.

The word "divider" as used herein and as used in the claims, is hereby defined to include either an analog or a digital divider.

The word "multiplier" as used herein and as used in the claims, is hereby defined to include either an analog or a digital multiplier.

The word "constant" is hereby defined for use herein and for use in the claims to mean "approximately constant" as either absolutely constant or constant over certain periods or manually adjustable only or otherwise adjustable.

In FIG. 2, it will be noted that potentiometer 59 generally will supply only a negative potential to resistor 62 at wiper 61 if the D.C. voltage at the output lead of analog divider 43 is generally only positive.

The phrase "one magnitude equal to another" is hereby defined for use herein and for use in the claims to mean that the absolute values of the magnitudes are equal to each other. Generally, as stated previously, for example, when the D.C. voltage on the output lead of divider 43 in FIG. 2 is positive, wiper 61 will be moved to a position where it is negative. The converse is also true.

The word "drive" is hereby defined for use herein and for use in the claims to mean a drive in either direction, e.g. a drive increasing or decreasing the oxygen flow rate through inlet conduit 13 of furnace 12 in FIG. 1.

The phrase "algebraic sum" is hereby defined for use herein and for use in the claims to have its conventional meaning. That is, the addition of a minus to a plus is the difference between the numbers.

Reference to sampler 21 in FIG. 1 likewise is a reference to sampler 21' in FIG. 6. Similarly, reference to any number having one or more prime marks is to be considered herein as a reference to the number with fewer or no prime marks. Conversely, reference to any number having no prime marks is also hereby defined to be a reference to a structure having this same number with one or more prime marks added.

From the foregoing, it will be noted that the Claus process is used at least for the purpose of producing sulfur and/or to remove sulfur from fluid streams which periodically or continuously contain 100 percent or some percent of hydrogen sulfide other than zero.

In FIG. 2, if the resistance of resistor 51 is properly selected, particular settings internally of the titrators may be over a wide range.

If desired, resistors 51 (FIG. 2), 125 (FIG. 4) and other resistors may be variable resistors to adjust gain and/or span.

What is claimed is:

1. A process control system comprising: first means for connection with apparatus confining the flow of a fluid, a portion or all of said fluid at least sometimes being hydrogen sulfide gas, said first means having an outlet conduit and being actuable to supply a flow of a sample of said fluid through said outlet conduit; first and second scrubbers, each of said scrubbers having an inlet conduit connected from said first means outlet conduit to receive first and second portions of said fluid sample, respectively, and having its own outlet conduit, said first and second scrubbers being chargeable with first and second solutions, respectively, such that said first and second scrubbers pass hydrogen sulfide and sulfur dioxide, respectively, whenever they are carried in said first and second fluid sample portions, respectively, and while said first and second scrubbers remove sulfur dioxide and hydrogen sulfide, respectively, from said first and second fluid sample portions, respectively; first and second coulometric titrators having first and second inlet conduits, respectively, and first and second electrical output leads, respectively, said first titrator inlet conduit being connected from said first scrubber outlet conduit to receive the fluid output thereof, said first titrator producing an electrical output signal on said first lead thereof of a magnitude directly proportional to the concentration of hydrogen sulfide in said sample fluid, said second titrator inlet conduit being connected from said second scrubber outlet conduit to receive the fluid which passes through said second scrubber outlet conduit, said second titrator producing an electrical output signal on said second output lead thereof of a magnitude directly proportional to the concentration of sulfur dioxide in said sample fluid; and second means connected from said first and second output leads of said first and second titrators, respectively, for connection with said flow confining apparatus at a location upstream of the connection of said first means therewith, said responsive to said titrator output signals and the magnitudes thereof for introducing oxygen in pure form or in a fluid mixture into said fluid confining apparatus at a variable flow rate and at a temperature to oxidize hydrogen sulfide therein; flow of fluid in said flow confining apparatus, said first means, said first and second scrubbers, said first and second titrators, and said second means each forming a link in a closed loop null seeking servo-mechanism in which said second means is actuable to vary or maintain constant said oxygen flow rate in a manner to drive the magnitudes of the output signals of said titrators to values indicating that there are concentrations larger than zero of both hydrogen sulfide and sulfur dioxide in said sample fluid and to values indicating that the concentration of hydrogen sulfide in said sample fluid times the molecular ratio 64/34 is approximately twice as large as the concentration of sulfur dioxide in said sample fluid.

2. The process control system as defined in claim 1, wherein a coalescer is adapted for connection with said flow confining apparatus downstream of the location at which said second means is adapted for connection therewith to form and to extract elemental sulfur from hydrogen sulfide ($H_2S$) and sulfur dioxide ($SO_2$) in said fluid in accordance with the chemical equation:

$$2H_2S + SO_2 \rightarrow 3S + 2H_2O$$

where H, S and O are symbols for the hydrogen, sulfur and oxygen atoms, respectively.

3. The process control system as defined in claim 2, wherein said first means is adapted for connection to said flow confining apparatus at a location downstream of the location at which said coalescer is adapted for connection with said flow confining apparatus.

4. The process control system as defined in claim 3, wherein said second means includes a controller connected from both of said titrator output leads, a furnace closed except for first and second inlets and an outlet, said first furnace inlet being adapted for connection from said flow confining means upstream of the respective locations at which said coalescer and said first means are adapted for connection with said flow confining apparatus, said furnace outlet being connected back to said flow confining apparatus at a predetermined location upstream of the respective locations at which said coalescer and said first means are adapted for connection with said flow confining apparatus, said second means including a source of a reaction fluid all or a portion of which contains oxygen, said reaction fluid source having an input device, being connected to said second furnace inlet, and being variable with said input device thereof to change the flow rate of oxygen into said furnace through said second furnace inlet, said controller having an output device connected to said reaction fluid source input device, said controller being constructed to vary said reaction fluid source input device through variation of said controller output device in a manner to drive the magnitudes of the signals on said titrator output leads to indicatee that the concentration of hydrogen sulfide in said sample fluid times the molecular ratio 64/34 is approximately twice as large as the concentration of sulfur dioxide in said sample fluid.

5. The process control system as defined in claim 1, wherein said second means includes a controller connected from both of said titrator output leads, a furnace closed except for first and second inlets and an outlet, said first furnace inlet being adapted for connection from said flow confining means upstream of the location at which said first means is adapted for connection with said flow confining apparatus, said furnace outlet being connected back to said flow confining apparatus at a predetermined location upstream of the location at which said first means is adapted for connection with said flow confining apparatus, said second means including a source of a reaction fluid all or a portion of which contains oxygen, said reaction fluid source having an input device connected to said second furnace inlet, and being variable with said input device thereof to change the flow rate of oxygen into said furnace through said second furnace inlet, said controller having an output device connected to said reaction fluid source input device, said controller being constructed to vary said reaction fluid source input device through variation of said controller output device in a manner to drive the magnitudes of the signals on said titrator output leads to indicate that the concentration of hydrogen sulfide in said sample fluid times the molecular ratio 64/34 is approximately twice as large as the concentration of sulfur dioxide in said sample fluid.

6. The process control system as defined in claim 2, wherein said second means includes a controller connected from both of said titrator output leads, a furnace closed except for first and second inlets and an outlet, said first furnace inlet being adapted for connection from said flow confining means upstream of the respective locations at which said coalescer and said first means are adapted for connection with said flow confining apparatus, said furnace outlet being connected back to said flow confining apparatus at a predetermined location upstream of the respective locations at which said coalescer and said first means are adapted for connection with said flow confining apparatus, said second means including a source of a reaction fluid all or a portion of which contains oxygen, said reaction fluid source having an input device, being connected to said second furnace inlet, and being variable with said input device thereof to change the flow rate of oxygen into said furnace through said second furnace inlet, said controller having an output device connected to said reaction fluid source input device, said controller being constructed to vary said reaction fluid source input device through variation of said controller output device in a manner to drive the magnitudes of the signals on said titrator output leads to indicate that the concentration of hydrogen sulfide in said sample fluid times the molecular ratio 64/34 is approximately twice as large as the concentration of sulfur dioxide in said sample fluid.

7. A process control system comprising: a source of an input fluid; apparatus connected from said input fluid source confining the flow of said input fluid therefrom, a portion or all of said input fluid at least sometimes being hydrogen sulfide gas; first means connected from said flow confining apparatus, having an outlet conduit, and being actuable to supply a flow of a sample of said input fluid through said outlet conduit; first and second scrubbers each having an inlet conduit connected from said first means outlet conduit to receive first and second portions, respectively, of said fluid sample, each of said first and second scrubbers having its own outlet conduit, said first and second scrubbers being charged with first and second solutions such that they pass hydrogen sulfide and sulfur dioxide, respectively, whenever they are or are carried in said first and second fluid sample portion, respectively, while they remove sulfur dioxide and hydrogen sulfide, respectively, from said first and second fluid sample portions, respectively; first and second coulometric titrators having first and second inlet conduits, respectively, and first and second electrical output leads, respectively, said first titrator inlet conduit being connected from said first scrubber outlet conduit, said first titrator producing an electrical output signal on said first lead thereof of a magnitude directly proportional to the concentration of hydrogen sulfide in said sample fluid, said second titrator inlet conduit being connected from said second scrubber outlet conduit, said second titrator producing an electrical output signal on said second output lead thereof of a magnitude directly proportional to the concentration of sulfur dioxide in said sample fluid; and second means connected from said first and second output leads of said first and second titrators, respectively, and connected to said flow confining apparatus at a location upstream of the connection of said first means therewith, and responsive to said titrator output signals and the magnitudes thereof for introducing oxygen in pure form or in a fluid mixture into said fluid confining apparatus at a variable flow rate and at a temperature to oxidize hydrogen sulfide therein; flow of fluid in said flow confining apparatus, said first means, said first and second scrubbers, said first and second titrators, and said second means each forming a link in a closed loop null seeking servo-mechanism in which said second means is actuable to vary to maintain constant said oxygen flow rate in a manner to drive the magnitudes of the output signals of said titrators to values indicating that there are concentrations larger than zero of both hydrogen sulfide and sulfur dioxide in said sample fluid and to values indicating that the concentration of sulfur dioxide in said sample fluid times the molecular ratio 34/64 is approximately one-half the concentration of hydrogen sulfide in said sample fluid.

8. The process control system as defined in claim 7, wherein a coalescer is connected with said flow confining apparatus downstream of the location at which said second means is connected therewith to form and to extract elemental sulfur from hydrogen sulfide ($H_2S$) and sulfur dioxide ($SO_2$) in said fluid in accordance with the chemical equation:

$$2H_2S + SO_2 \rightarrow 3S + 2H_2O$$

where H, S and O are symbols for the hydrogen, sulfur and oxygen atoms, respectively.

9. The process control system as defined in claim 8, wherein said first means is connected to said flow confining apparatus at a location downstream of the location at which said coalescer is connected thereto.

10. The process control system as defined in claim 9, wherein said second means includes a controller connected from both of said titrator output leads, a furnace closed except for first and second inlets and an outlet, said first furnace inlet being adapted for connection from said flow confining means upstream of the respective locations at which said coalescer and said first means are connected with said flow confining apparatus, said furnace outlet being connected back to said flow confining apparatus at a predetermined location upstream of the respective locations at which said coalescer and said first means are connected with said flow confining apparatus, said second means including a source of a reaction fluid all or a portion of which contains oxygen, said reaction fluid source having an input device, being connected to said second furnace inlet, and being variable with said input device thereof to change the flow rate of oxygen into said furnace through said second furnace inlet, said controller having an output device connected to said reaction fluid source input device, said controller being constructed to vary said reaction fluid source input device through variation of said controller output device in a manner to drive the magnitudes of the signals on said titrator output leads to indicate that the concentration of sulfur dioxide in said sample fluid times the molecular ratio 34/64 is approximately one-half as large as the concentration of hydrogen sulfide in said sample fluid.

11. The process control system as defined in claim 7, wherein said second means includes a controller connected from both of said titrator output leads, a furnace closed except for first and second inlets and an outlet, said first furnace inlet being adapted for connection from said flow confining means upstream of the location at which said first means are connected with said flow confining apparatus, said furnace outlet being connected back to said flow confining apparatus at a predetermined location upstream of the location at which said first means are connected with said flow confining apparatus, said second means including a source of reaction fluid all or a portion of which contains oxygen, said reaction fluid source having an input device, being connected to said second furnace inlet, and being variable with said input device thereof to change the flow rate of oxygen into said furnace through said second furnace inlet, said controller having an output device connected to said reaction fluid source input device, said controller being constructed to vary said reaction fluid source input device through variation of said controller output device in a manner to drive the magnitudes of the signals on said titrator output leads to indicate that the concentration of sulfur dioxide in said sample fluid times the molecular ratio 34/64 is approximately one-half as large as the concentration of hydrogen sulfide in said sample fluid.

12. The process control system as defined in claim 7, wherein said second means includes a controller connected from both of said titrator output leads, a furnace closed except for first and second inlets and an outlet, said first furnace inlet being adapted for connection from said flow confining means upstream of the respective locations at which said coalescer and said first means are connected with said flow confining apparatus, said furnace outlet being connected back to said flow confining apparatus at a predetermined location upstream of the respective locations at which said coalescer and said first means are connected with said flow confining apparatus, said second means including a source of reaction fluid all or a portion of which contains oxygen, said reaction fluid source having an input device, being connected to said second furnace inlet, and being variable with said input device thereof to change the flow rate of oxygen into said furnace through said second furnace inlet, said controller having an output device connected to said reaction fluid source input device, said controller being constructed to vary said reaction fluid source input device through variation of said controller output device in a manner to drive the magnitudes of the signals on said titrator ouput leads to indicate that the concentration of sulfur dioxide in said sample fluid times the molecular ratio 34/64 is approximately one-half as large as the concentration of hydrogen sulfide in said sample fluid.

* * * * *